United States Patent
Luo et al.

(10) Patent No.: US 12,423,850 B2
(45) Date of Patent: Sep. 23, 2025

(54) FOOTSTEP PLANNING METHOD, ROBOT AND COMPUTER-READABLE STORAGE MEDIUM

(71) Applicant: UBTECH ROBOTICS CORP LTD, Shenzhen (CN)

(72) Inventors: Zhiping Luo, Shenzhen (CN); Xiang Liu, Shenzhen (CN); Jun Cheng, Shenzhen (CN); Jianxin Pang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 488 days.

(21) Appl. No.: 17/383,448

(22) Filed: Jul. 23, 2021

(65) Prior Publication Data
US 2022/0040859 A1 Feb. 10, 2022

(30) Foreign Application Priority Data
Aug. 4, 2020 (CN) .......................... 202010772561.9

(51) Int. Cl.
*G06T 7/60* (2017.01)
*G06T 17/20* (2006.01)
*B25J 13/08* (2006.01)

(52) U.S. Cl.
CPC .............. *G06T 7/60* (2013.01); *G06T 17/205* (2013.01); *B25J 13/08* (2013.01); *G06T 2207/10028* (2013.01); *G06T 2210/12* (2013.01)

(58) Field of Classification Search
None
See application file for complete search history.

(56) References Cited

U.S. PATENT DOCUMENTS

| 11,348,269 | B1* | 5/2022 | Ebrahimi Afrouzi ....................... G06T 7/0002 |
| 2013/0184861 | A1* | 7/2013 | Pratt .................... B62D 57/032 901/1 |
| 2022/0011778 | A1* | 1/2022 | Chidlovskii ............ G06T 7/136 |

FOREIGN PATENT DOCUMENTS

CA 2352671 A1 * 6/2000

OTHER PUBLICATIONS

Kanoulas, Dimitrios, et al. "Footstep planning in rough terrain for bipedal robots using curved contact patches." 2018 IEEE International Conference on Robotics and Automation (ICRA). IEEE, 2018 (Year: 2018).*

Kanoulas, Dimitrios, Nikos G. Tsagarakis, and Marsette Vona. "Curved patch mapping and tracking for irregular terrain modeling: Application to bipedal robot foot placement." Robotics and Autonomous Systems 119 (2019): 13-30. (Year: 2019).*

(Continued)

*Primary Examiner* — Vincent Rudolph
*Assistant Examiner* — Meredith Taylor

(57) ABSTRACT

A footstep planning method includes: obtaining a number of depth images of an environment in a walking direction of a legged robot; creating a three-dimensional model of the environment based on the depth images; determining at least one even region from the three-dimensional model of the environment; and selecting one or more of the at least one even region as one or more candidate footstep locations for the legged robot to step on.

13 Claims, 9 Drawing Sheets

(56) References Cited

OTHER PUBLICATIONS

M. Y. Benzian and N. Benamrane, "3D Mesh Segmentation by Region Growing based on Discrete Curvature," 2020 1st International Conference on Communications, Control Systems and Signal Processing (CCSSP), El Oued, Algeria, 2020, pp. 271-276, doi: 10.1109/CCSSP49278.2020.9151831.). (Year: 2020).*

Lorensen, William E., and Harvey E. Cline. "Marching cubes: A high resolution 3D surface construction algorithm." Seminal graphics: pioneering efforts that shaped the field. 1998. 347-353. (Year: 1987).*

Ladicky (Ladicky, Lubor, et al. "From point clouds to mesh using regression." Proceedings of the IEEE International Conference on Computer Vision. 2017.) (Year: 2017).*

\* cited by examiner

FOOTSTEP PLANNING METHOD, ROBOT AND COMPUTER-READABLE STORAGE MEDIUM

CROSS REFERENCE TO RELATED APPLICATIONS

This application claims priority on Patent Application No. 202010772561.9 filed in People's Republic of China on Aug. 4, 2020, which is hereby incorporated by reference herein as if set forth in its entirety.

BACKGROUND

1. Technical Field

The present disclosure generally relates to robots, and particularly to footstep planning method and a legged robot.

2. Description of Related Art

A key issue with respect to legged robots (e.g., humanoid robots) is footstep planning, whose main goal is to plan a discrete sequence of footsteps as well as the corresponding continuous motion of the robot. This can be challenging, especially when the legged robots navigate uneven terrain.

Therefore, there is a need to provide a footstep planning method and robot to overcome above-mentioned problem.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
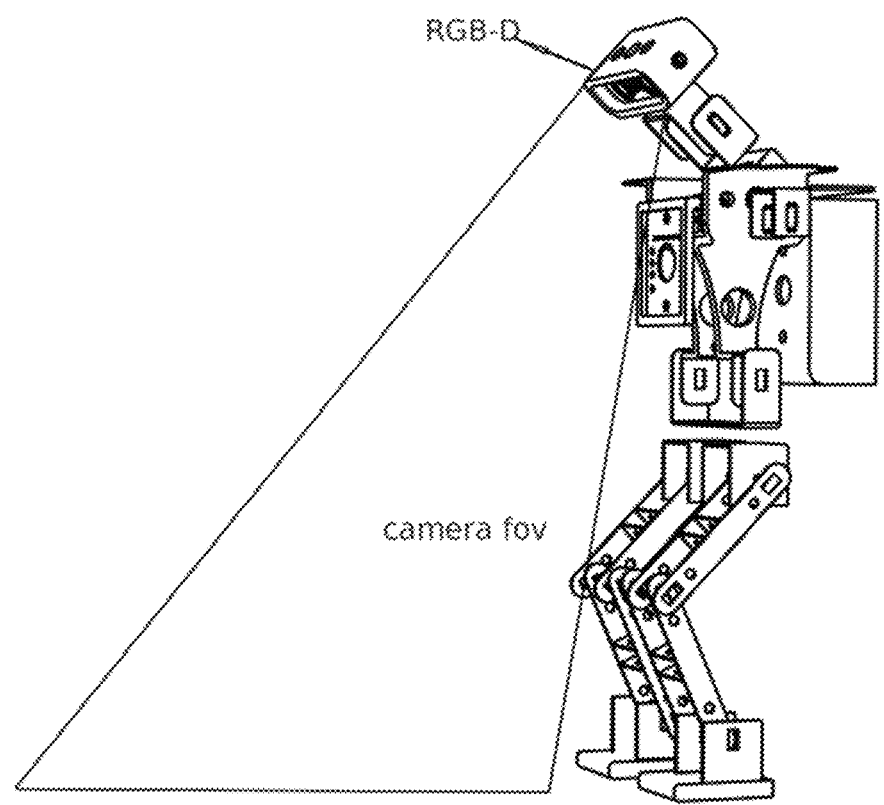
FIG. 1 is a schematic view of a legged robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

FIG. 1 shows a schematic diagram of a legged robot (e.g., a humanoid robot) having two legs. The head, waist or other parts of the humanoid robot 1 may be equipped with a depth camera. The depth camera can be a time of flight (ToF) camera or an RGB-D camera. The camera is arranged in such a way that it can provide coverage for the front lower area of the robot 1. The horizontal field angle of view, the vertical field angle of view, and the frame rate of the output depth images of the depth camera are not limited. For example, the horizontal field angle of view of the depth camera can be set to 60 degrees, the vertical field angle of view to 45 degrees, and the frame rate of the depth images output by the depth camera can be set to no less than 30 fps. Based on this vertical field angle of view, the depth camera can capture depth images of ground area in front of the robot 1 within a certain distance (for example, 2 meters) of the robot.

Figure 2:
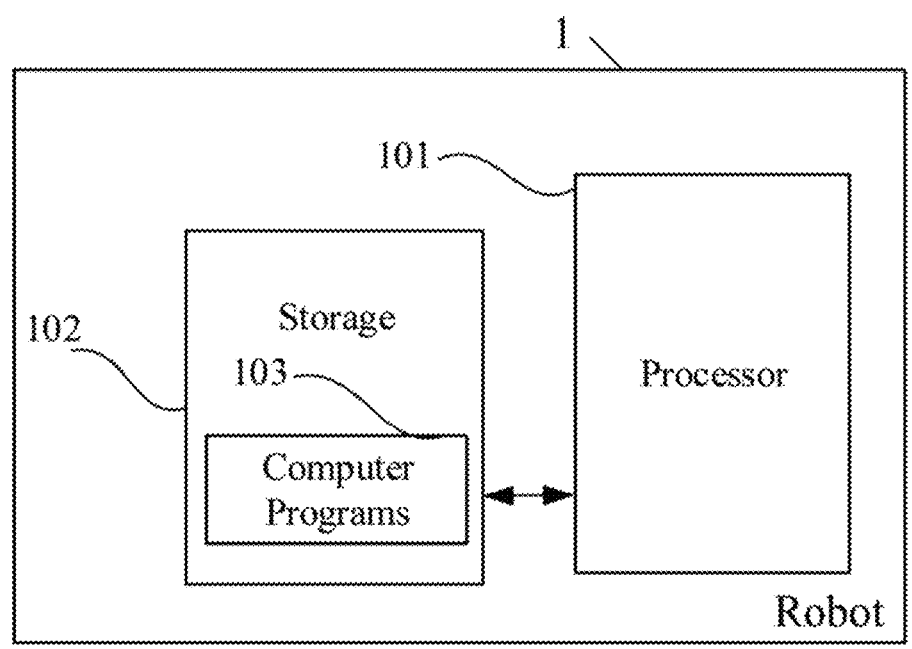
FIG. 2 is a schematic block diagram of the legged robot according to one embodiment.
Figure 5:
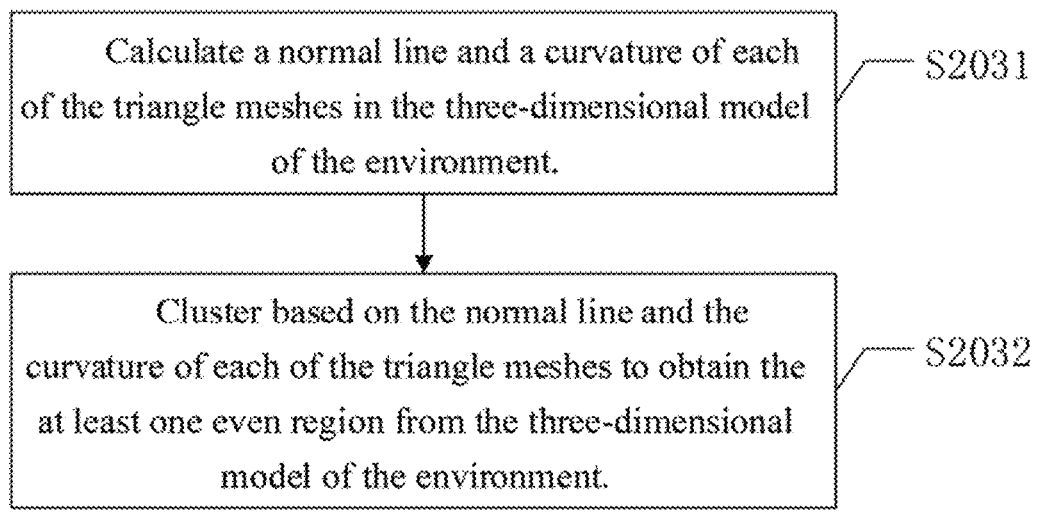
FIG. 5 is a schematic flowchart of a method for determining even regions in the 3D model according to one embodiment.
Figure 6:
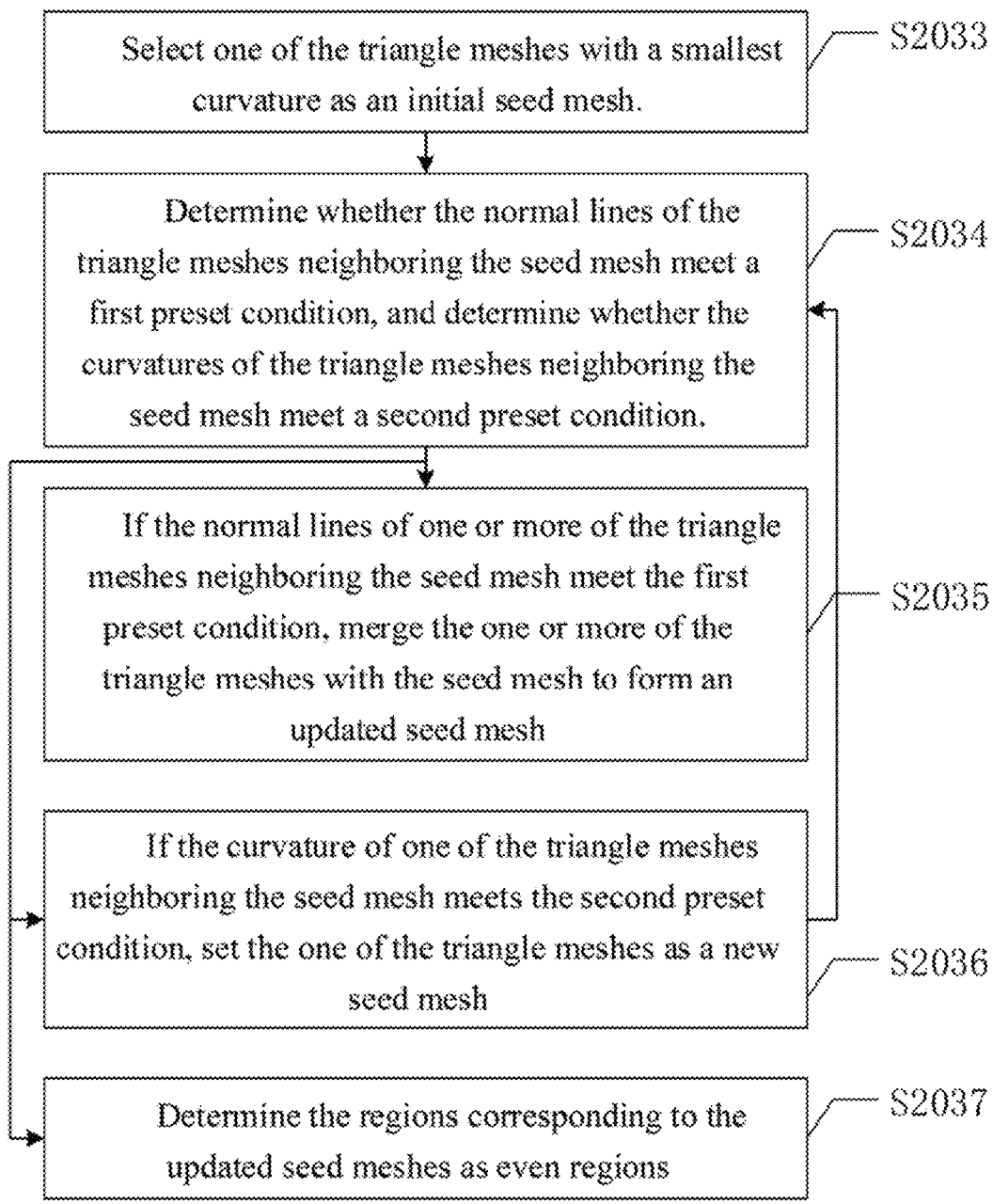
FIG. 6 is a schematic flowchart of a method for clustering the triangle meshes according to one embodiment.

FIG. 2 shows a schematic block diagram of the legged robot 1 according to one embodiment. The robot 1 may include a processor 101, a storage 102, and one or more executable computer programs 103 that are stored in the storage 102. The processor 101 is electrically connected to the storage 102, and performs corresponding operations by executing the executable computer programs 103 stored in the storage 102. When the processor 101 executes the computer programs 103, the steps in the embodiments of the method for controlling the robot 1, such as steps S201 through S204 in FIG. 3, steps S2031 to S2032 in FIG. 5, and steps S2033 through S2037 in FIG. 6, are implemented.

The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like.

The storage 102 may be an internal storage unit of the robot 1, such as a hard disk or a memory. The storage 102 may also be an external storage device of the robot 1, such as a plug-in hard disk, a smart memory card (SMC), and a secure digital (SD) card, or any suitable flash cards. Furthermore, the storage 102 may also include both an internal storage unit and an external storage device. The storage 102 is used to store computer programs, other programs, and data required by the robot. The storage 102 can also be used to temporarily store data that have been output or is about to be output.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robot 1. For example, the one or more computer programs 112 may be divided into a obtaining unit that is configured to obtain a number of depth images of an environment in a walking direction of a legged robot, a creating unit that is configured to create a three-dimensional model of the environment based on the depth images, a determining unit that is configured to determine at least one even region from the three-dimensional model of the environment and a selecting unit that is configured to select one or more of the at least one even region as one or more candidate footstep locations for the legged robot to step on.

Figure 3:
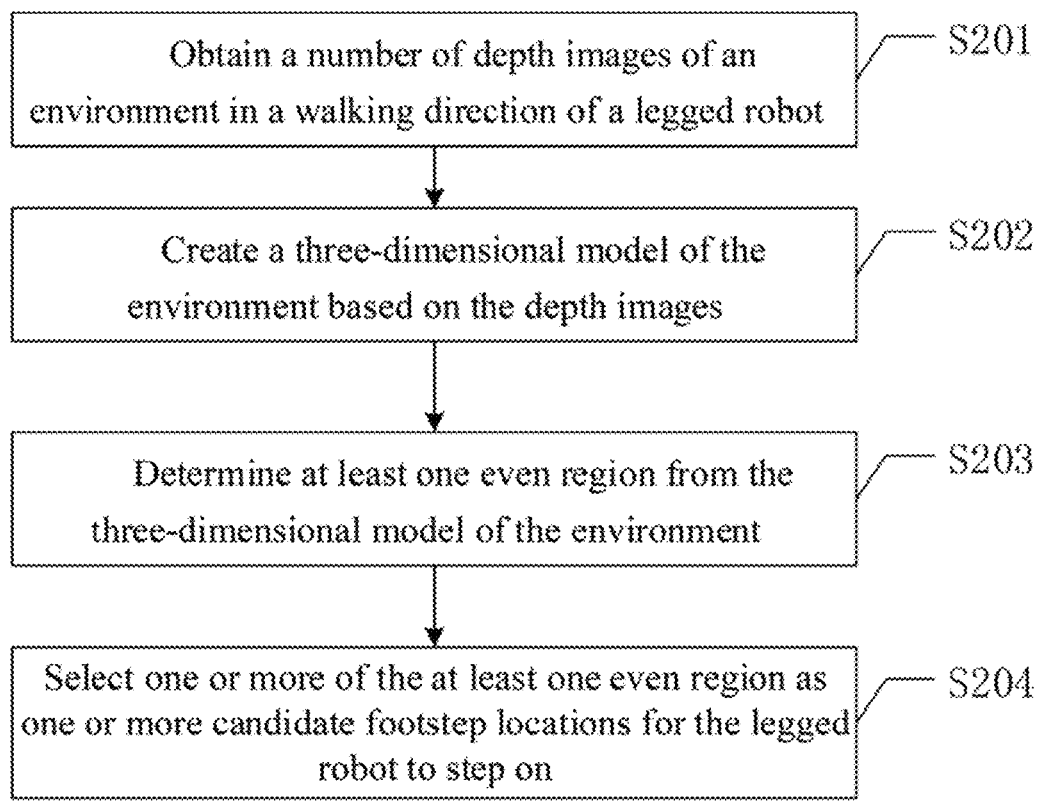
FIG. 3 is a schematic flowchart of a footstep planning method according to one embodiment.

FIG. 3 shows an exemplary flowchart of a footstep planning method according to one embodiment. The method can be implemented to control the robot 1 shown in FIG. 1. In one embodiment, the method may include steps S201 to S204.

Step S201: Obtain a number of depth images of an environment in a walking direction of the legged robot 1.

The legged robot 1 has two legs and can walk exactly the way a human being does. When the legged robot 1 is walking, depth images of the environment in the walking direction of the legged robot 1 can be obtained using the depth camera. Since the camera is designed to face the front lower area of the surface (e.g., ground) where the robot 1 walks, the depth images captured by the camera contain depth information of the front lower area of the surface where the robot 1 walks.

Step S202: create a three-dimensional model of the environment based on the depth images.

Figure 4:
FIG. 4 is an exemplary diagram of a 3D model of an environment in the walking direction and in front of the legged robot.

The robot can perform a gridding to the obtained depth images to create the three-dimensional model of the environment. The three-dimensional model of the environment is represented by triangle meshes. The creating process of the three-dimensional model of the environment is as follows: The robot 1 defines the space in the walking direction and in front of the robot 1 as a voxel grid, and converts the depth images into a three-dimensional point cloud. According to the current pose and the internal parameters of the depth camera, the depth images of the environment can be mapped to the defined cube grid for gridding processing, and a three-dimensional environment model corresponding to the depth images can be obtained. The above-mentioned gridding processing refers to connecting the positions in the voxel grid whose values of signed distance field (SDF) are equal to 0, and then constructing vertexes of triangle meshes using a preset algorithm (e.g., marching cube algorithm). It should be noted that the 3D model of the environment may change as the robot walks, and the updating process of the 3D model of the environment will not be repeated here. FIG. 4 shows an example of the three-dimensional model of the environment.

In one embodiment, after obtaining several frames (e.g., 10 frames) of depth images of the environment, the robot 1 may fuse the several frames of depth images of the environment, and then create a three-dimensional model of the environment based on the fused depth images of the environment.

Step S203: Determine at least one even region from the three-dimensional model of the environment.

In one embodiment, the three-dimensional model of the environment can be considered as a three-dimensional terrain map. The robot 1 can determine at least one even region from the three-dimensional model of the environment. Referring to FIG. 5, in one embodiment, the robot 1 may determine the at least one even region from the three-dimensional model of the environment based on the normal lines and curvatures of the triangle meshes. The step S203 may further include the following steps.

Step S2031: Calculate a normal fine and a curvature of each of the triangle meshes in the three-dimensional model of the environment.

Considering that the robot 1 can obtain the normal line and curvature of each triangle mesh through the same processing procedure, calculation of the normal line and curvature for one triangle mesh is taken as an example to explain the calculation process of the normal lines and curvatures of the triangle meshes.

Specifically, the robot 1 calculates the normal line and the curvature of each vertex in the triangle mesh. The robot 1 then calculates an average of the normal lines and an average of the curvatures of the vertexes of the triangle mesh, and determine the average of the normal lines of the vertexes of the triangle mesh as the normal line of the triangle mesh and determines the average of the curvatures of the vertexes of the triangle mesh as the curvatures of the triangle mesh. It should be noted that the normal line of a vertex of the triangle mesh is the cross product of the two edge vectors with the vertex as the starting point, and the normal line is perpendicular to the two edge vectors.

Step S2032: Cluster based on the normal line and the curvature of each of the triangle meshes to obtain the at least one even region from the three-dimensional model of the environment.

By clustering based on the normal line and the curvature of each of the triangle meshes, two or more of the triangle meshes in the same plane can be merged into a single mesh to obtain the at least one even region. Referring to FIG. 6, in one embodiment, the clustering process may include the following steps.

Step S2033: Select one of the triangle meshes with a smallest curvature as an initial seed mesh.

In one embodiment, the robot 1 can traverse the curvatures of all triangle meshes in a given range, find the triangle mesh with the smallest curvature, and determine the triangle mesh as the initial seed mesh. It can be considered that the triangle mesh with the smallest curvature represents the smoothest area, which can be used as the starting state of an even region and gradually search outwards to realize the exploration of all the even regions. In addition, starting from the smoothest area and searching outwards can reduce the total number of segments, thereby improving the efficiency of searching for even regions.

Step S2034: Determine whether the normal lines of the triangle meshes neighboring the seed mesh meet a first preset condition, and determine whether the curvatures of the triangle meshes neighboring the seed mesh meet a second preset condition.

The determination of whether the normal line of a triangle mesh neighboring the seed mesh meets the first preset condition can be realized through the following process. Specifically, an angle between the normal line of the triangle mesh neighboring the seed mesh and the normal line of the seed mesh is first calculated. If the angle is less than a preset value, it is determined that the triangle mesh neighboring the seed mesh meets the first condition. If the angle is greater than or equal to the preset value, it is determined that the triangle mesh neighboring the seed mesh does not meet the first condition.

The determination of whether the curvature of a triangle mesh neighboring the seed mesh meets the second preset condition can be realized through the following process. Specifically, the curvature of the triangle mesh neighboring the seed mesh is compared with a curvature threshold. If the curvature is less the curvature threshold, it is determined that the triangle mesh meets the second preset condition. If the curvature is greater than or equal to the curvature threshold, it is determined that the triangle mesh does not meet the second preset condition.

Step S2035: In response to the normal lines of one or more of the triangle meshes neighboring the seed mesh meeting the first preset condition, merge the one or more of the triangle meshes neighboring the seed mesh with the seed mesh to form an updated seed mesh.

The checking of whether the normal lines of the triangle meshes neighboring the seed mesh meet a first preset condition serves as basis to update the seed mesh. That is, the robot 1 uses the current area represented by the initial seed grid as the initial state of an even region, and determines whether areas represented by the triangle meshes neighboring the seed mesh can be added into the even region. Only when the normal lines of the triangle meshes neighboring the seed mesh meet the first preset condition, the triangle meshes neighboring the seed mesh are merged with the seed mesh, so as to update the seed mesh. The updated seed mesh represents an even region including the original even region represented by the original seed and the regions represented by the triangle meshes neighboring the original seed mesh.

Step S2036: In response to the curvature of one of the triangle meshes neighboring the seed mesh meeting the second preset condition, set the one of the triangle meshes neighboring the seed mesh as a new seed mesh. After that, the procedure goes back to the step S2034 to check the triangle meshes neighboring the new seed mesh and determine whether the even region represented by the new seed mesh can be updated.

The checking of whether the curvatures of the triangle meshes neighboring the seed mesh meet the second preset condition is to find new seed meshes. That is, when the curvature of one triangle mesh neighboring the seed mesh meets the second preset condition, the triangle mesh is determined as a new seed mesh. After a new seed mesh is found, the procedure goes back to step S2034.

Step S2037: Determine the regions corresponding to the updated seed meshes as even regions.

After no new seed meshes are found, that is, the curvatures of all of the triangle meshes neighboring the seed meshes including the initial seed mesh and new seed meshes do not meet the second preset condition, the search for new seed meshes and the updating of the seed meshes are terminated. The robot 1 can then determine the regions represented by all the seed meshes as even regions.

In one embodiment, an empty seed mesh sequence can be created when the searching for even regions starts. When a newly found seed is found, it can be added to the seed mesh sequence. After the, normal lines and curvatures of all the triangle meshes neighboring a seed mesh has been checked, the seed mesh is removed from the seed mesh sequence. In this way, after all the seed meshes have been removed from the seed mesh sequence, it is determined that the no new seed meshes are found.

In one embodiment, the robot 1 can first divide the three-dimensional model of the environment into several three-dimensional regions, and executes steps S2033 to S2037 in each three-dimensional region to find the even regions. For example, the three-dimensional model of the environment may be divided into 4*4 three-dimensional regions, and search for even regions in each three-dimensional region.

In another embodiment, after setting the one of the triangle meshes with a smallest curvature as an initial seed mesh, the robot 1 may execute the steps S2033 to S2037 to search for even regions. After that, the triangle meshes other than the initial seed mesh and its neighboring triangle meshes are checked to find a triangle mesh having a smallest curvature. If the smallest curvature is less than a preset lower limit of curvature threshold, the triangle mesh is set as a new seed mesh. The robot 1 then executes the steps S2033 to S2037 based on the new seed mesh. The operation above is repeated until no new seed meshes are found.

Through the above process, the robot 1 can find even regions from the three-dimensional model of the environment. It should be noted that the even region is not limited to a ground surface. For example, in the case of an object (e.g., stone block) on the ground having a large even surface, the even surface of the object may be determined as an even region.

Step S204: Select one or more of the at least one even region as one or more candidate footstep locations for the legged robot to step on.

Figure 7:
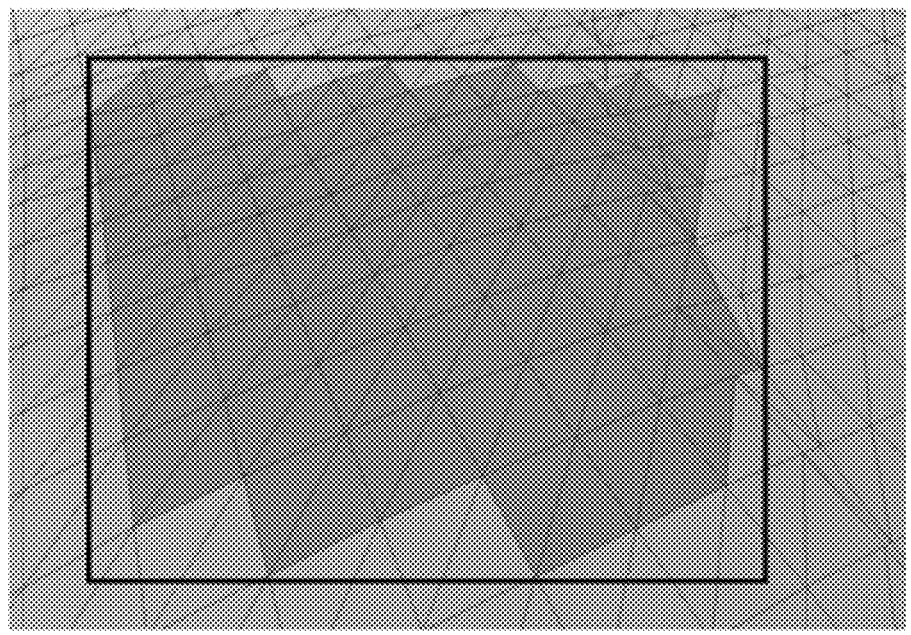
FIG. 7 is an exemplary diagram of a smallest bounding box.

In one embodiment, multiple even regions may be found in step S203. The even regions may have different areas. In order to avoid the robot 1 from falling down, a filtering may be performed as follows. Specifically, the step S204 may include the following steps: determine a smallest rectangular bounding box for each of the at least one even region; determine whether the smallest rectangular bounding box of each of the at least one even region meets a preset condition; and in response to one or more of the smallest rectangular bounding boxes meeting the preset condition, determine one or more of the at least one even region corresponding to the one or more of the smallest rectangular bounding boxes as one or more candidate footstep locations for the legged robot to step on. In one embodiment, when the smallest rectangular bounding box of an even region can surround a foot of the robot 1, it is determined that the smallest rectangular bounding box of the even region meets the preset condition. FIG. 7 shows an exemplary diagram of a smallest rectangular bounding box of an even region. It should be noted that the robot 1 can compensate the size of the smallest rectangular bounding box of an even region according to the distance between the even region and the robot 1. Through the above process, even regions that are too small can be filtered out, and even regions that are qualified for the robot 1 to step on can be found.

Figure 8:
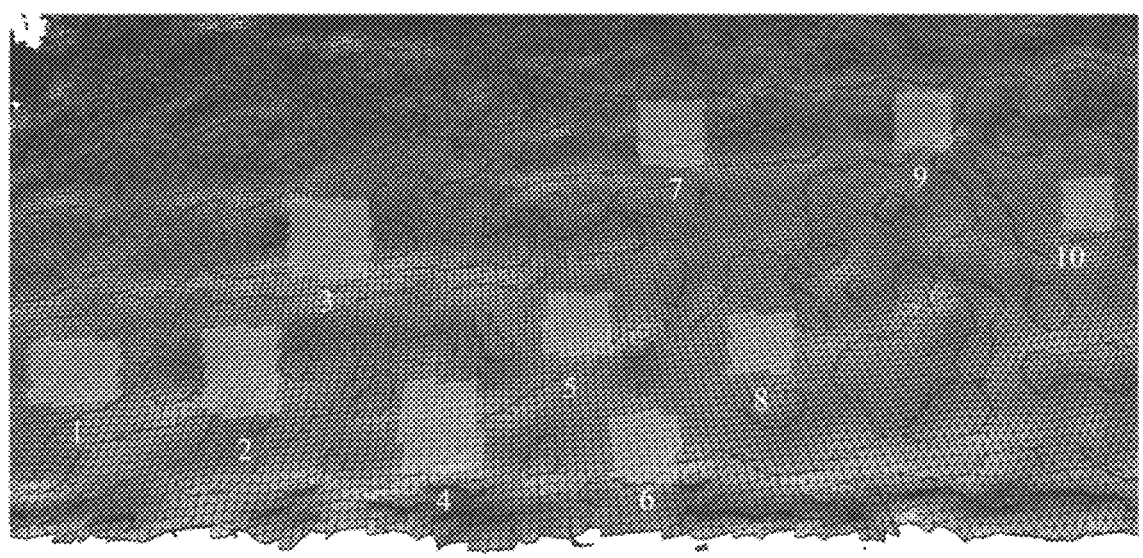
FIG. 8 shows exemplary candidate footstep locations in the 3D model.

In one embodiment after obtaining the candidate footstep locations, the robot 1 may further determine desired footstep locations from the candidate footstep locations according to the step length of the robot 1. The desired footstep locations are locations that are within one step away from the current location of the supporting leg of the robot and available for the swinging leg of the robot to step on. FIG. 8 shows ten exemplary candidate footstep locations 1 through 10. Since the candidate footstep locations 1, 2, 3, 7, 9, and 10 are not within one step away from the current location of the supporting leg of the robot, the candidate footstep locations 4, 5, 6, and 8 can be determined as desired footstep locations. The swinging leg of the robot may step on one of the desired footstep locations.

By implementing the method of the embodiments above, a legged robot can obtain a number of depth images of the environment using its depth camera, and perform 3D reconstruction based on the depth images of the environment to obtain a 3D model of the environment. Through the analysis of the 3D model of the environment, even regions where the robot can step on can be determined as footstep locations, which facilitates the path planning of the robot and reduces the occurrence of the robot falling down due to stopping on an obstacle.

It should be noted that sequence numbers in the foregoing processes do not indicate execution sequences. Execution sequences of the processes should be determined according to functions and internal logic of the processes, and shall not constitute any limitation on implementation processes of the embodiments of the present application.

Figure 9:
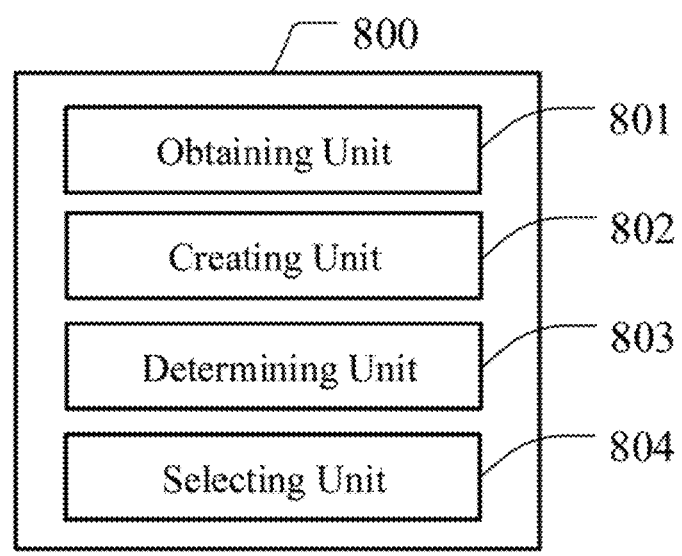
FIG. 9 is a schematic block diagram of a footstep planning device according to one embodiment.

Referring to FIG. 9, in one embodiment, a footstep planning device 800 may include an obtaining unit 801, a creating unit 802, a determining unit 803, and a selecting unit 804. The obtaining unit 801 is configured to obtain a number of depth images of an environment in a walking direction of a legged robot. The creating unit 802 is configured to create a three-dimensional model of the environment based on the depth images. The determining unit 803 is configured to determine at least one even region from the three-dimensional model of the environment. The selecting unit 804 is configured to select one or more of the at least one even region as one or more candidate footstep locations for the legged robot to step on.

In one embodiment, the three-dimensional model of the environment is represented by triangle meshes. The determining unit 803 may include a calculation unit that is configured to calculate a normal line and a curvature of each of the triangle meshes in the three-dimensional model of the environment, and a clustering unit that is configured to cluster based on the normal line and the curvature of each of the triangle meshes to obtain the at least one even region from the three-dimensional model of the environment.

In one embodiment, the calculation unit may include a first calculation unit, a second calculation unit, and a determining unit. The first calculation unit is configured to calculate a normal line and a curvature of each vertex in each of the triangle meshes. The second calculation unit is configured to calculate an average of the normal lines and an average of the curvatures of the vertexes of each of the triangle meshes. The determining unit is configured to determine the averages of the normal lines of the vertexes of the triangle meshes as the normal lines of the triangle meshes, and determine the averages of the curvatures of the vertexes of the triangle meshes as the curvatures of the triangle meshes.

In one embodiment, the clustering unit may include an initializing unit, a determining unit, an updating unit, a seed mesh determining unit, and an even region determining unit. The initializing unit is configured to select one of the triangle meshes with a smallest curvature as an initial seed mesh. The determining unit is configured to determine whether the normal lines of the triangle meshes neighboring the seed mesh meet a first preset condition, and determine whether the curvatures of the triangle meshes neighboring the seed mesh meet a second preset condition. The updating unit is configured to, in response to the normal lines of one or more of the triangle meshes neighboring the seed mesh meeting the first preset condition, merge the one or more of the triangle meshes neighboring the seed mesh with the seed mesh to form an updated seed mesh. The seed mesh determining unit is configured to, in response to the curvature of one of the triangle meshes neighboring the seed mesh meeting the second preset condition, set the one of the triangle meshes neighboring the seed mesh as a new seed mesh. The even region determining unit is configured to determine a region corresponding to the updated seed mesh as one of the at least one even region.

In one embodiment, the determining unit of the clustering unit may further include an tangle calculation unit and a condition determining unit. The angle calculation unit is configured to calculate an angle between the normal line of each of the of the triangle meshes neighboring the seed mesh and the normal line of the seed mesh. The condition determining unit is configured to, in response to one or more of the angles being less than a preset value, determine that the one or more of the triangle meshes neighboring the seed mesh corresponding to the one or more of the angles meet the first condition.

In me embodiment, the determining unit of the clustering unit may further include a comparing unit and a condition determining unit. The comparing unit is configured to compare the curvature of each of the triangle meshes neighboring the seed mesh with a curvature threshold. The condition determining unit is configured to, in response to one or more of the triangle meshes neighboring the seed mesh being less the curvature threshold, determine that the one or more of the triangle meshes neighboring the seed mesh meeting the second preset condition.

In one embodiment, the selecting unit 804 may include a determining unit, a condition determining unit, and an even region determining unit. The determining unit is configured to determine a smallest rectangular bounding box for each of the at least one even region. The condition determining unit is configured to determine whether the smallest rectangular hounding box of each of the at least one even region meets a preset condition. The even region determining unit is configured to, in response to one or more of the smallest rectangular bounding boxes meeting the preset condition, determine one or more of the at least one even region corresponding to the one or more of the smallest rectangular bounding boxes as one or more candidate footstep locations for the legged robot to step on.

With such configuration, the footstep planning device can obtain a number of depth images of the environment using a depth camera, and perform 3D reconstruction based on the depth images of the environment to obtain a 3D model of the environment. Through the analysis of the 3D model of the environment, even regions where a robot can step on can be determined as footstep locations, which facilitates the path planning of the robot and reduces the occurrence of the robot falling down due to stepping on an obstacle.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals. It should be noted that, the content included in the computer readable medium could be appropriately increased and decreased according to requirements of legislation and patent practice under judicial jurisdictions. For example, in some judicial jurisdictions, the computer readable medium does not include the electric carrier signal and the telecommunication signal according to the legislation and the patent practice.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:
1. A computer-implemented footstep planning method, comprising:
    obtaining a plurality of depth images of an environment in a walking direction of a legged robot;
    creating a three-dimensional model of the environment based on the depth images;
    determining at least one even region from the three-dimensional model of the environment; and
    selecting one or more of the at least one even region as one or more candidate footstep locations for the legged robot to step on;
    wherein the three-dimensional model of the environment is represented by triangle meshes, and is created by mapping the depth images to a voxel grid for a gridding processing, wherein the gridding processing comprises: connecting positions in the voxel grid and constructing vertexes of the triangle meshes using a preset algorithm, and wherein values of signed distance field of the connected positions in the voxel grid are equal to 0; and
    wherein determining the at least one even region from the three-dimensional model of the environment, comprises:
        calculating a normal line and a curvature of each of the triangle meshes in the three-dimensional model of the environment; and
        clustering based on the normal line and the curvature of each of the triangle meshes to obtain the at least one even region from the three-dimensional model of the environment;
        wherein clustering based on the normal line and the curvature of each of the triangle meshes to obtain the at least one even region from the three-dimensional model of the environment, comprises:
        (a) selecting one of the triangle meshes with a smallest curvature as an initial seed mesh;

(b) determining whether the normal lines of the triangle meshes neighboring the seed mesh meet a first preset condition, and determining whether the curvatures of the triangle meshes neighboring the seed mesh meet a second preset condition;

(c) in response to the normal lines of one or more of the triangle meshes neighboring the seed mesh meeting the first preset condition, merging the one or more of the triangle meshes neighboring the seed mesh with the seed mesh to form an updated seed mesh;

(d) in response to the curvature of one of the triangle meshes neighboring the seed mesh meeting the second preset condition, setting the one of the triangle meshes neighboring the seed mesh as a new seed mesh and going back to (b);

(e) determining a region corresponding to the updated seed mesh as one of the at least one even region; and wherein calculating the normal line and the curvature of each of the triangle meshes in the three-dimensional model of the environment comprises:

calculating a normal line and a curvature of each vertex in each of the triangle meshes, wherein a normal line of a vertex of a triangle mesh is a cross product of two edge vectors with the vertex of the triangle mesh as a starting point, and the normal line of the vertex of the triangle mesh is perpendicular to the two edge vectors;

calculating an average of the normal lines and an average of the curvatures of the vertexes of each of the triangle meshes; and determining the averages of the normal lines of the vertexes of the triangle meshes as the normal lines of the triangle meshes, and determining the averages of the curvatures of the vertexes of the triangle meshes as the curvatures of the triangle meshes.

2. The method of claim 1, wherein determining whether the normal lines of the triangle meshes neighboring the seed mesh meet the first preset condition, comprises:

calculating an angle between the normal line of each of the of the triangle meshes neighboring the seed mesh and the normal line of the seed mesh;

in response to one or more of the angles being less than a preset value, determining that the one or more of the triangle meshes neighboring the seed mesh corresponding to the one or more of the angles meet the first condition.

3. The method of claim 2, wherein determining whether the curvatures of the triangle meshes neighboring the seed mesh meet the second preset condition, comprises:

comparing the curvature of each of the triangle meshes neighboring the seed mesh with a curvature threshold; and in response to one or more of the triangle meshes neighboring the seed mesh being less the curvature threshold, determining that the one or more of the triangle meshes neighboring the seed mesh meeting the second preset condition.

4. The method of claim 1, wherein selecting the one or more of the at least one even region as the one or more candidate footstep locations for the legged robot to step on, comprises:

determining a smallest rectangular bounding box for each of the at least one even region, and compensating a size of the smallest rectangular bounding box of each even region according to a distance between the each even region and the legged robot;

determining whether the smallest rectangular bounding box of each of the at least one even region meets a preset condition; and in response to one or more of the smallest rectangular bounding boxes meeting the preset condition, determining one or more of the at least one even region corresponding to the one or more of the smallest rectangular bounding boxes as one or more candidate footstep locations for the legged robot to step on; and wherein the method further comprises:

determining desired footstep locations from the one or more candidate footstep locations according to a step length of the legged robot, wherein the desired footstep locations are locations that are within one step away from a current location of a supporting leg of the legged robot and available for a swinging leg of the legged robot to step on.

5. The method of claim 1, wherein the depth images are obtained by a depth camera on the legged robot, a horizontal field angle of view of the depth camera is set to 60 degrees, a vertical field angle of view of the depth camera is set to 45 degrees, a frame rate of the depth images output by the depth camera is set to no less than 30 fps, and the depth images comprise depth information of a front lower area of a surface where the legged robot walks.

6. The method of claim 1, wherein several frames of the depth images of the environment are obtained, and creating the three-dimensional model of the environment based on the depth images comprises:

fusing the several frames of the depth images of the environment, and creating the three-dimensional model of the environment based on the fused depth images of the environment;

wherein a space in the walking direction and in front of the legged robot is defined as the voxel grid, the depth images are converted into a three-dimensional point cloud, and the depth images are mapped to the voxel grid for the gridding processing according to a pose and internal parameters of the depth camera; and wherein the preset algorithm comprises a marching cube algorithm.

7. The method of claim 1, wherein an empty seed mesh sequence is created when searching for even region starts; when a seed mesh is found, the found seed mesh is added to the seed mesh sequence; and after normal lines and curvatures of all the triangle meshes neighboring a seed mesh are checked, the seed mesh is removed from the seed mesh sequence; and wherein after step (e), the method further comprises:

checking triangle meshes other than the initial seed mesh and neighboring triangle meshes of the initial seed mesh to find a triangle mesh having a smallest curvature;

in response to the smallest curvature of the found triangle mesh being less than a preset lower limit of curvature threshold, setting the found triangle mesh as a new seed mesh, and return to executing the steps (a) to (e) based on the new seed mesh until no new seed meshes are found.

8. A legged robot comprising:
one or more processors;
a memory; and
one or more programs, wherein the one or more programs are stored in the memory and configured to be executed by the one or more processors, the one or more programs comprises:

instructions for obtaining a plurality of depth images of an environment in a walking direction of a legged robot;
instructions for creating a three-dimensional model of the environment based on the depth images;
instructions for determining at least one even region from the three-dimensional model of the environment; and
instructions for selecting one or more of the at least one even region as one or more candidate footstep locations for the legged robot to step on;
wherein the three-dimensional model of the environment is represented by triangle meshes, and is created by mapping the depth images to a voxel grid for a gridding processing, wherein the gridding processing comprises: connecting positions in the voxel grid and constructing vertexes of the triangle meshes using a preset algorithm, and wherein values of signed distance field of the connected positions in the voxel grid are equal to 0; and
wherein the instructions for determining the at least one even region from the three-dimensional model of the environment, comprise:
instructions for calculating a normal line and a curvature of each of the triangle meshes in the three-dimensional model of the environment; and
instructions for clustering based on the normal line and the curvature of each of the triangle meshes to obtain the at least one even region from the three-dimensional model of the environment;
wherein the instructions for clustering based on the normal line and the curvature of each of the triangle meshes to obtain the at least one even region from the three-dimensional model of the environment, comprise:
instructions for selecting one of the triangle meshes with a smallest curvature as an initial seed mesh;
instructions for determining whether the normal lines of the triangle meshes neighboring the seed mesh meet a first preset condition, and determining whether the curvatures of the triangle meshes neighboring the seed mesh meet a second preset condition;
instructions for, in response to the normal lines of one or more of the triangle meshes neighboring the seed mesh meeting the first preset condition, merging the one or more of the triangle meshes neighboring the seed mesh with the seed mesh to form an updated seed mesh;
instructions for, in response to the curvature of one of the triangle meshes neighboring the seed mesh meeting the second preset condition, setting the one of the triangle meshes neighboring the seed mesh as a new seed mesh; and
instructions for determining a region corresponding to the updated seed mesh as one of the at least one even region; and
wherein the instructions for calculating the normal line and the curvature of each of the triangle meshes in the three-dimensional model of the environment comprise:
instructions for calculating a normal line and a curvature of each vertex in each of the triangle meshes;
instructions for calculating an average of the normal lines and an average of the curvatures of the vertexes of each of the triangle meshes; and
instructions for determining the averages of the normal lines of the vertexes of the triangle meshes as the normal lines of the triangle meshes, and determining the averages of the curvatures of the vertexes of the triangle meshes as the curvatures of the triangle meshes.

9. The robot of claim 8, wherein the instructions for determining whether the normal lines of the triangle meshes neighboring the seed mesh meet the first preset condition, comprise:
instructions for calculating an angle between the normal line of each of the of the triangle meshes neighboring the seed mesh and the normal line of the seed mesh; and
instructions for, in response to one or more of the angles being less than a preset value, determining that the one or more of the triangle meshes neighboring the seed mesh corresponding to the one or more of the angles meet the first condition.

10. The robot of claim 9, wherein the instructions for determining whether the curvatures of the triangle meshes neighboring the seed mesh meet the second preset condition, comprise:
instructions for comparing the curvature of each of the triangle meshes neighboring the seed mesh with a curvature threshold; and
instructions for, in response to one or more of the triangle meshes neighboring the seed mesh being less the curvature threshold, determining that the one or more of the triangle meshes neighboring the seed mesh meeting the second preset condition.

11. The robot of claim 8, wherein the instructions for selecting one or more of the at least one even region as one or more candidate footstep locations for the legged robot to step on, comprise:
instructions for determining a smallest rectangular bounding box for each of the at least one even region;
instructions for determining whether the smallest rectangular bounding box of each of the at least one even region meets a preset condition; and
instructions for, in response to one or more of the smallest rectangular bounding boxes meeting the preset condition, determining one or more of the at least one even region corresponding to the one or more of the smallest rectangular bounding boxes as one or more candidate footstep locations for the legged robot to step on.

12. A non-transitory computer-readable storage medium storing one or more programs to be executed in a legged robot, the one or more programs, when being executed by one or more processors of the legged robot, causing the legged robot to perform processing comprising:
obtaining a plurality of depth images of an environment in a walking direction of a legged robot;
creating a three-dimensional model of the environment based on the depth images;
determining at least one even region from the three-dimensional model of the environment; and
selecting one or more of the at least one even region as one or more candidate footstep locations for the legged robot to step on;
wherein the three-dimensional model of the environment is represented by triangle meshes, and is created by mapping the depth images to a voxel grid for a gridding processing, wherein the gridding processing comprises: connecting positions in the voxel grid and constructing vertexes of the triangle meshes using a preset algorithm, and wherein values of signed distance field of the connected positions in the voxel grid are equal to 0; and
wherein determining the at least one even region from the three-dimensional model of the environment, comprises:

calculating a normal line and a curvature of each of the triangle meshes in the three-dimensional model of the environment; and clustering based on the normal line and the curvature of each of the triangle meshes to obtain the at least one even region from the three-dimensional model of the environment;

wherein clustering based on the normal line and the curvature of each of the triangle meshes to obtain the at least one even region from the three-dimensional model of the environment, comprises:

(a) selecting one of the triangle meshes with a smallest curvature as an initial seed mesh;

(b) determining whether the normal lines of the triangle meshes neighboring the seed mesh meet a first preset condition, and determining whether the curvatures of the triangle meshes neighboring the seed mesh meet a second preset condition;

(c) in response to the normal lines of one or more of the triangle meshes neighboring the seed mesh meeting the first preset condition, merging the one or more of the triangle meshes neighboring the seed mesh with the seed mesh to form an updated seed mesh;

(d) in response to the curvature of one of the triangle meshes neighboring the seed mesh meeting the second preset condition, setting the one of the triangle meshes neighboring the seed mesh as a new seed mesh and going back to (b);

(e) determining a region corresponding to the updated seed mesh as one of the at least one even region;

wherein determining whether the normal lines of the triangle meshes neighboring the seed mesh meet the first preset condition, comprises:

calculating an angle between the normal line of each of the of the triangle meshes neighboring the seed mesh and the normal line of the seed mesh;

in response to one or more of the angles being less than a preset value, determining that the one or more of the triangle meshes neighboring the seed mesh corresponding to the one or more of the angles meet the first condition; and wherein determining whether the curvatures of the triangle meshes neighboring the seed mesh meet the second preset condition, comprises:

comparing the curvature of each of the triangle meshes neighboring the seed mesh with a curvature threshold; and in response to one or more of the triangle meshes neighboring the seed mesh being less the curvature threshold, determining that the one or more of the triangle meshes neighboring the seed mesh meeting the second preset condition.

13. The non-transitory computer-readable storage medium of claim 12, wherein calculating a normal line and a curvature of each of the triangle meshes in the three-dimensional model of the environment comprises:

calculating a normal line and a curvature of each vertex in each of the triangle meshes;

calculating an average of the normal lines and an average of the curvatures of the vertexes of each of the triangle meshes; and determining the averages of the normal lines of the vertexes of the triangle meshes as the normal lines of the triangle meshes, and determining the averages of the curvatures of the vertexes of the triangle meshes as the curvatures of the triangle meshes.

* * * * *